United States Patent [19]
Jokinen

[11] Patent Number: 5,850,968
[45] Date of Patent: Dec. 22, 1998

[54] AIR CONDITIONER WITH SELECTED RANGES OF RELATIVE HUMIDITY AND TEMPERATURE

[76] Inventor: Teppo K. Jokinen, 1214 Lucerne Ave., Lake Worth, Fla. 33460

[21] Appl. No.: 892,128

[22] Filed: Jul. 14, 1997

[51] Int. Cl.⁶ ................................................ F24F 5/00
[52] U.S. Cl. .................... 236/44 C; 62/176.6; 165/223
[58] Field of Search ................. 62/176.1, 176.6; 236/44 C; 165/146, 223

[56] References Cited

U.S. PATENT DOCUMENTS

| | | |
|---|---|---|
| 1,424,689 | 8/1922 | Stone . |
| 1,956,872 | 5/1934 | Morse et al. . |
| 2,236,190 | 3/1941 | Wolfert .................................. 62/176.6 |
| 2,256,127 | 9/1941 | Smith ..................................... 62/176.6 |
| 2,268,361 | 12/1941 | Walker et al. .......................... 165/146 |
| 3,285,332 | 11/1966 | Silvern . |
| 3,289,746 | 12/1966 | Kline . |
| 3,464,486 | 9/1969 | Rice . |
| 3,915,376 | 10/1975 | Attridge et al. . |
| 3,938,348 | 2/1976 | Rickert ................................... 62/176.1 |
| 4,034,803 | 7/1977 | Reed et al. . |
| 4,649,710 | 3/1987 | Inoue et al. . |
| 4,750,545 | 6/1988 | Hile et al. . |
| 4,869,073 | 9/1989 | Kawai et al. . |
| 5,086,831 | 2/1992 | Paikert et al. .......................... 165/146 |
| 5,129,234 | 7/1992 | Alford . |
| 5,303,561 | 4/1994 | Bahel et al. ............................ 62/176.6 |
| 5,346,129 | 9/1994 | Shah et al. ............................. 236/44 C |

Primary Examiner—William E. Tapolcai
Attorney, Agent, or Firm—A. David Pellinen

[57] ABSTRACT

An air conditioning system with temperature and relative humidity sensors connected to a computerized control system. The control system acts on preselected stored data to turn on the air conditioning system to maintain the environment within a selected comfort zone. Air flow through finless coils and a preset damper enter a constant speed blower to an air duct. The air in the ducts remains over the dew point. In an alternative arrangement a coil with fins as well as a coil without fins is used.

14 Claims, 2 Drawing Sheets

AIR CONDITIONER WITH SELECTED RANGES OF RELATIVE HUMIDITY AND TEMPERATURE

BACKGROUND OF THE INVENTION

1. Field of the Invention

This invention relates to an air conditioning system and more particularly to an air handling system that senses both relative humidity and temperature. The invention is directly applicable to systems used for home and commercial applications.

2. Description of the Related Art

Under ordinary conditions and circumstances home air conditioning systems are not concerned with relative humidity as a controlling parameter. Most air conditioners have a thermostat centrally located where the controlling parameter is temperature. The term thermostat, in this context, means a device used to regulate or otherwise control temperature. Thus, if one feels uncomfortably warm or cold then the thermostat is set lower or higher, respectively.

In summer when the outside temperature of an occupied building that is being cooled rises, the relative humidity inside the building rises too and the air feels cold and damp. In winter when the inside air is heated then the relative humidity decreases, the air feels dry, and breathing could become labored and the skin raw.

What these well known facts point out is that humans are very sensitive to moisture. On the other hand most air conditioning or air handling units used in homes have only temperature as the controlling parameter.

This is not to say that moisture has been neglected in the control of air conditioners. U.S. Pat. No. 4,869,073 to Kawai et al has both temperature and humidity sensors in a heat pump system employing a compressor, a four way valve, an outdoor heat exchanger, an expansion valve, and an indoor heat exchanger. During a cooling mode the system for predetermined time periods.

Inoue et al, in U.S. Pat. No. 4,649,710, teaches an air conditioner with both temperature and humidity sensors in a device that relates to a coating booth, computer room, clean room, or laboratories where upon starting an air conditioner in the winter season the air introduced into the system is raised to a level to avoid the formation of water droplets.

One of the drawbacks of conventional home air conditioners is that they are overbuilt, that is to say that they are oversized for what they really need to do. Thus it is not uncommon for a 5 ton unit to be sold and used where a 3 ton unit would suffice. This is done because the units are usually controlled only with respect to temperature, the temperature being considered the critical criterion.

Another drawback of conventional home air conditioners is that the air ducts used with them become breeding grounds for bacteria because dew point is not a design consideration. Air duct temperatures vary greatly and can confront great temperature gradients. The cooling air in an attic duct undergoes variations in temperature. The duct temperature can be 55 degrees Fahrenheit while the surrounding attic temperature can easily be at 110 degrees Fahrenheit or higher. Indeed the colder the system tries to keep the circulating air at, and the warmer the attic gets, the greater the temperature gradient Since temperature flows from hot to cold areas the resulting variations enhance the accumulation of moisture within the air ducts. Thus a breeding ground for bacteria and other contaminants exists to plague the occupants.

SUMMARY OF THE INVENTION

An object of the invention is to provide an air conditioning system which features improved comfort to the user. A preselected range of temperature and humidity establishes a comfort zone which is pleasant to the occupants. The preselected range is chosen by the user through appropriate settings on a control panel.

A further object of the invention is to provide a control system for a constant speed blower which responds to sensed temperature and humidity to turn the blower on and off. A constant speed blower also serves to reduce initial cost because they are cheaper than variable speed blowers which are conventionally used in the art of home air conditioners.

A further object of the invention is to provide a bypass path for air with a preset damper to control the air flow. A preset damper helps standardize the units, avoids user manipulation, and also eliminates damper control mechanisms, itself another cost saver.

Another object of the invention is to provide a cooling coil without fins. The elimination of fins means that water vapor that is condensed will have less chance to evaporate because any condensed water will be removed from the system sooner. Accordingly the coils of the present invention will remove water at a higher rate than conventional home systems.

While coils without fins offer substantial advantages there may be situations where finless coils can be combined with finned coils. Coils with fins are very adequate, of course, to drop the temperature in an environment. Combining both a finless coil with a finned coil offers the advantages of decreasing the temperature with a finned coil and decreasing the humidity with a finless coil.

Thus a further object of the present invention is to combine a finless coil with finned coil resulting in a coil that affects temperature as well as humidity.

Sensed temperature and relative humidity signals are fed to a control circuit which includes a microcomputer. A preestablished comfort zone for a range of temperature and humidity is based on a user's preferences and desires. If the relative humidity or temperature varies outside of this range the blower is turned on or off, which blower is run at a constant speed. The combination of a constant speed blower and a preset damper cause air to flow at relatively lower speed over the finless coils. This advantageously aids in the removal of water vapor.

Because the invention senses humidity and temperature and not temperature alone the resulting temperature in the air duct will always be higher than the dew point. This is a key advantage of the invention because when the temperature is kept above the dew point less moisture is present and there is less accumulation and growth of bacteria.

DETAILED DESCRIPTION OF THE INVENTION

Figure 1:
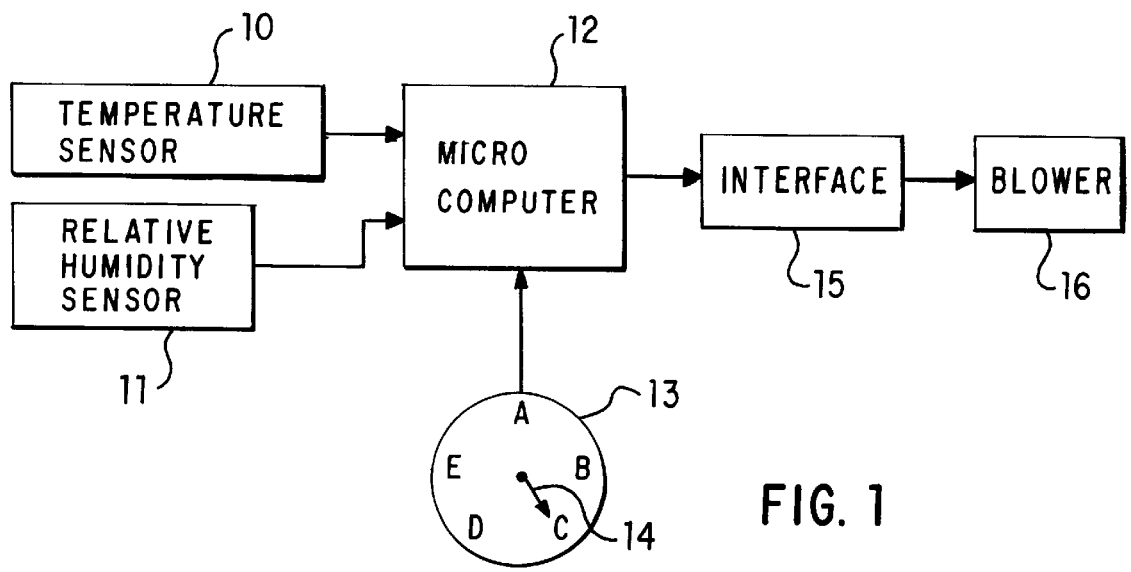
FIG. 1 shows a block diagram of the present invention.

FIG. 1 shows a block diagram of the present invention. Temperature sensor 10 is a semiconductor type integrated sensor having a voltage output proportional to temperature. Similarly humidity sensor 11 is a semiconductor type integrated sensor having a voltage output proportional to relative humidity. These sensors have their outputs connected to microprocessor 12.

Microprocessor 12 is preset and programmed to establish ranges of comfortable temperature and relative humidity, that is, comfort zones. The term comfort is a subjective term, that is, it exists in the mind. For example, the ASHRAE HANDBOOK, FUNDAMENTALS, I-P Edition, 1993, at page 8.16 defines thermal comfort as "that condition of mind in which satisfaction is expressed with the thermal environment". Similarly in the present invention a comfort zone is a selected zone of temperature and relative humidity that an occupant of a dwelling or a user of the air conditioning system will be satisfied with, or with which satisfaction is expressed. No limitation is intended as to the disclosed specific values or ranges of temperature or relative humidity as they are so subjective and relate to a condition of mind as aptly expressed by ASHRAE with respect to thermal comfort.

Another input to microprocessor 12 is user adjustable control 13 with a dial 14 that has various possible settings. The control 13 is shown with a rotatable dial having settings A, B, C, D, and E. Of course the rotatable dial shown is by of example only. The dial could be a linear dial or it could be part of a liquid crystal display. Liquid crystal displays are very popular and offer the advantage of a digitized display. The settings A through E provide five possible settings but the actual number of settings employed is subject to design.

The controller/microcomputer 12 is responsive to the sensed temperature and relative humidity to control the on/off condition of blower 16 which is part of an an air conditioning unit or air handling system to keep the dwelling at a comfortable level with respect to both temperature and relative humidity.

The air handling system can be part of an overall control system typical in home dwellings which include the usual heating devices and fans, not shown. One advantage of the present invention is that it is easily adaptable to be included as part of presently used systems. Thus the heating system can operate normally during the heating season as well as permit the flexibility to have only a fan on. Thus the inventive system can, of course, be installed as part of a new unit or as an add-on unit to an existing system.

The microprocessor, operating at low voltage levels, and through an appropriate interface 15, controls the blower 16, which operates at higher voltage and current levels. The blower is preferably a constant speed blower operating at a lower speed than is generally found in home air conditioning systems. The use of a blower operating at a low and constant speeds is another cost effective advantage of the invention.

Figure 2:
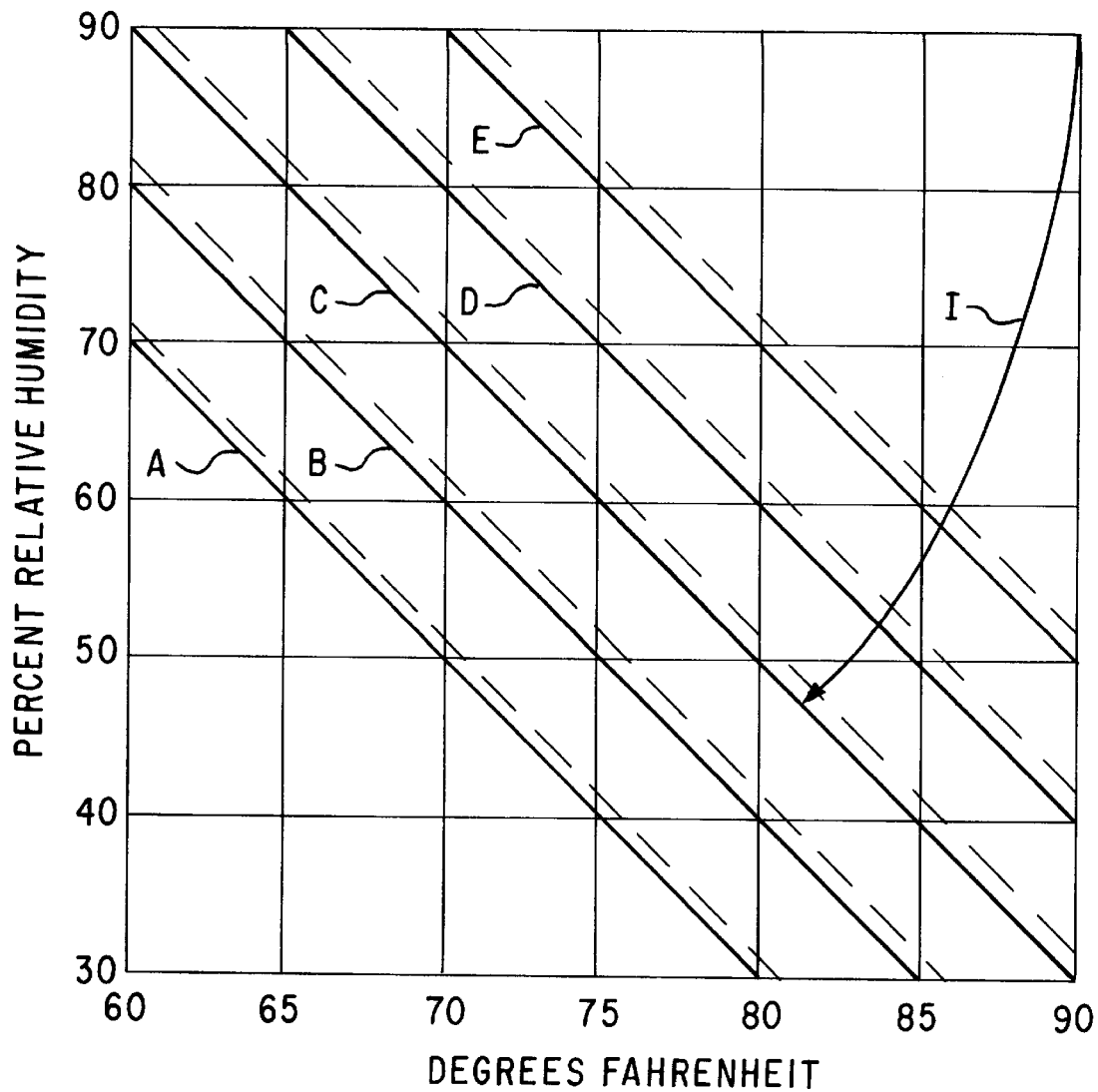
FIG. 2 shows a comfort zone range according to the invention.

FIG. 2 shows a comfort zone ranges according to the invention. The abscissa shows temperature in degrees Fahrenheit and the ordinate shows percent relative humidity. Five sets of paired lines, each having a dash line and a solid line, are shown. A first set of lines at A represents a selected comfort zone or levels. When the temperature and humidity are above the level represented by dashed line the air conditioner is ON. When the conditioned air reaches the level represented by solid line 22 the air conditioner turns OFF. It is a feature of the present invention that the controller responds via the sensors to both temperature and relative humidity variations to determine whether the ambient conditions are with respect to these levels.

Four more sets of of paired lines, each with a dashed line and a solid line, are shown at B, C, D, and E, to represent other comfort zones or comfort levels. As noted user adjustable control 13 is selectable to choose settings from A to E. When the user moves the dial to position E then the controller will respond and control the air conditioner with respect to the temperature and relative humidity zones represented by the paired lines at E. In a manner similar to that with respect to pair A, any time the sensed temperature and humidity are above the dashed line the air conditioner is ON. When the conditioned air reaches the solid line 26 the air conditioner turns OFF.

The user has the choice of selecting the comfort zone A, B, C, D or E which will cause the controller to operate in accordance with the new comfort zone selected. The size of the zone established between the solid line and dashed line is a matter of design and no limitation is intended by the graphical display of FIG. 2.

The microcomputer 12 will perform predetermined comparisons and arithmetic operations based on stored data and sensed temperature and relative humidity. The stored data include a series of different levels, each series constituting a level above which the air conditioner will go on and another level at which air conditioner will go off. Advantageously, in the event of a power failure an EEPROM will save data so that power interruptions will have minimal impact on the controller or microcomputer. By way of example the comfort zones shown in FIG. 2 are mathematically derived from the formula $$C=(90-RH)+2(90-T), \qquad \text{equation (1)}$$

where C=a calculated comfort value,
RH=the sensed percent relative humidity, and
T=the sensed temperature of the dwelling in degrees Fahrenheit.

Solving equation (1) for RH with a comfort value of 80:

$$RH=90-C+2(90-T)=90-C+180-2T$$

$$RH=90-80+180-2T$$

$$RH=190-2T \qquad \text{equation (2)}$$

For a temperature of 75 degrees the relative humidity RH becomes $$RH=190-2\times75$$

$$RH=190-150$$

$$RH=40 \qquad \text{equation (3)}$$

For a comfort value of 80 the relative humidity and temperature are shown in table 1below and plotted as the sold line at A in FIG. 2.

TABLE 1

| Relative Humidity | Temperature |
|---|---|
| 70 | 60 |
| 60 | 65 |
| 50 | 70 |
| 40 | 75 |
| 30 | 80 |

The solid line provides a comfortable level of relative humidity and temperature. Clearly the comfort level of a user may differ from another user and even the same user may desire a different level of comfort at different times. It is a simple matter to turn the adjustable control 13 to another comfort level B, C, D, or E. Choosing comfort level E would provide a range of temperature and relative humidity along the solid line E of FIG. 2. The five comfort zones shown in FIG. 2 are by way of example only. The could be more than five zones or there could be less than five zones. The actual number of zones is a matter of design and choice. Similarly the actual slope of the lines in FIG. 2 is a design choice.

The various levels of comfort such as levels A through E are preselected and set into the microcomputer. All the user needs to do is choose one of five levels as shown. All the user needs to do is selectively choose a level the user is comfortable with. Thus the invention offers a simple yet effective way to change comfort levels according to one's own desires. As noted it is well known that human beings are sensitive to moisture. Humans are generally uncomfortable when the humidity is high and the surrounding air is cold. Air can keep absorbing moisture but when the air is at 100% relative humidity the air can no longer absorb body moisture and humans sweat and become uncomfortable. According to the invention the humidity is decreased and the temperature can be at a higher level and thus humans can remain comfortable. The invention is particularly useful in the summer and particularly in more tropical areas where high humidity levels are often encountered. By decreasing the relative humidity while permitting the temperature to increase great savings in energy are possible as the need to keep the temperature low is a major cost in operating conventional air conditioning systems.

Figure 3:
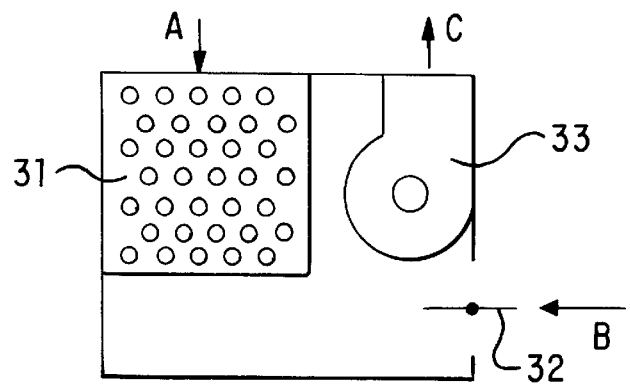
FIG. 3 is a view of the structure of an air conditioning system according to the present invention using a finless coil.

FIG. 3 is a view of the structure of an air conditioning system according to the present invention. Room air flows along path A past finless coils 31 having a suitable refrigerant or coolant flowing through them. Additional air also flows along path B which includes a factory preset damper 32. Blower 33 turns on is response to a command from the microprocessor 12 of FIG. 1 to cause a mixture of air cooled by coils 41 and the air B through the damper, to enter the cooling ducts at C.

It is an important feature of the invention that the coils 31 do not have fins which are usually associated with residential air conditioners. Because there are no fins and with the blower operating at a low speed water vapor that has condensed will have less chance to evaporate because any condensed water will be removed from the system sooner. Accordingly, the coils of the present invention aid in removing water at a higher rate than conventional home systems.

In operation the temperature and relative humidity sensors have their outputs connected to controller 12, a computerized control system. Assume the user has selected a comfort zone C, associated with the pair of lines at C in FIG. 2. The air conditioner is on and stays on as long as the sensed temperature and relative humidity of the ambient air are above the level selected by zone C. The conditioned air may follow a path designated by the Roman numeral I as an example. When the conditioned air, or ambient air, reaches the solid line the air conditioner turns off. If the environment is below the solid line the air conditioner remains off. Choosing a level other than C causes the same kind of on/off operation to take place. That is, above the level selected by the user the air conditioner is on until the level of temperature and relative humidity associated with the solid line is reached. If the environment rises above the level shown by the dashed line the air conditioner is on until it reaches the solid line.

Thus the control system acts on preselected stored data to turn on an air conditioning system to maintain the environment at a particular comfort level. Constant speed blower 33 causes air flow through finless coils and a preset damper to enter an air duct. A key advantage of the invention is that the air in the ducts will be over the dew point. Air that is over the dew point will not condense with the result the air ducts remain clean. Without water bacteria cannot grow and the discomfiture associated with bacteria is reduced or eliminated, leading to a healthier environment. In many residential systems the air temperature in a duct is as low as 50 degrees Fahrenheit. In the present invention this temperature can increased to 70 degrees, a warmer region consuming much less energy, while still at a comfortable level for most people.

The invention provides a much more efficient system than has been previously available. There are significant cost savings with the use of a smaller air conditioning unit. For example where a 5 ton air conditioning system is presently used it can be replaced by a 3 ton system. Such a replacement is possible because systems relying only on temperature control need to be oversized for the dwelling. Relying on temperature alone causes greater energy to be used because the system needs to be cooled to a much greater extent than the present invention where humidity is a design criterion. As humidity is decreased then somewhat higher temperatures are possible letting occupants enjoy a comfortable level of humidity and temperature. Operating at higher temperatures means less energy needs to be used in turn making a lower cost system is possible.

The constant speed blower can be a small unit operating at a low speed. By contrast variable speed motors are commonly used in present air conditioners where cooling is the basic criterion. The coils typically have fins and the system operates at high speeds. There is an ample supply of condensed water which evaporates and thus water in the form of vapor will return to the dwelling environment. This is wasted energy in an attempt to cool the dwelling. Moreover the removal of moisture is at a minimum because the air has not been given enough time to release water onto the surface of the coil. Air temperature must be below the dew point so that water will condense to vapor. Thus cooling requirements are at a maximum and humidity is secondary consideration, if at all. When air runs through coils at low speeds cooling requirements are minimized and the removal of moisture maximized.

Figure 4:
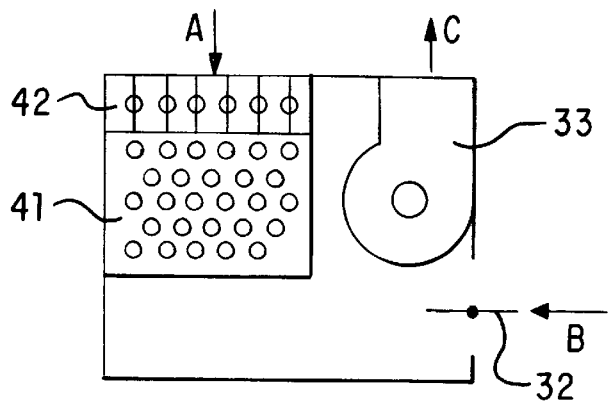
FIG. 4 is a view of another embodiment of the structure of an air conditioning system according to the present invention using both a finless coil and a finned coil.

FIG. 4 is a view of another embodiment of the structure of an air conditioning system according to the present invention using both a finless coil and a finned coil. Finned coils can lower temperature more rapidly than finless coils. On the other hand finless coils can remove moisture more rapidly than finned coils, particularly when the inventive technique is used. It may be desirable to employ the advantages of each in some cases. The embodiment of FIG. 4 shows such a use. Room air flows along path A entering a finned coil 42 first and continuing through finless coil 41. The volumes that the respective coils occupy together is subject to design. By way of example only, the finless coil may occupy, as shown in FIG. 4, about three time as much as the finned coil. Additional air also flows along path B which includes a factory preset damper 32. Blower 33 turns on is response to a command from the microprocessor 12 of FIG. 1 to cause a mixture of air A cooled by coils 41 and 42 and the air B through the damper 32, to enter the cooling ducts at C. The control of the blower is the same as in the embodiment of FIG. 3.

I claim:

1. An improved air handling system comprising:

a relative humidity sensor;

a temperature sensor;

a controller;

a blower;

a coil without fins;

said blower when on causing air to flow over said coil through said blower;

said relative humidity sensor and said temperature sensor connected to said controller;

said controller having stored data that includes a series of different ranges of relative humidity and temperature, said different ranges constitutional different zones of relative humidity and temperature;

said controller responding to said relative humidity sensor, said temperature sensor, and said stored data to provide an output signal indicative of the variation of said temperature and said relative humidity compared to a selected range of relative humidity and temperature;

said controller having output signals to control said blower to turn said blower on and off;

whereby when the temperature sensed by said temperature sensor and the relative humidity sensed by said relative humidity sensor are outside said selected range said blower is turned on.

2. The improved air handling system of claim 1 wherein said controller is a microcomputer.

3. The improved air handling system of claim 1 wherein an input to said controller is an adjustable control device to selectively choose one of said different ranges.

4. The improved air handling system of claim 3 where there are five of said different ranges that can be selected.

5. The improved air handling system of claim 1 wherein additional air flows through a damper to the blower.

6. The improved air handling system of claim 5 wherein the damper is preset.

7. The improved air handling system of claim 1 wherein said blower is a constant speed blower.

8. An improved air handling system comprising:

a relative humidity sensor;

a temperature sensor;

a controller;

a blower;

a coil with fins;

a coil without fins;

said blower when on causing air to flow over said coil with fins and said coil without fins through said blower;

said relative humidity sensor and said temperature sensor connected to said controller;

said controller having stored data that includes a series of different ranges of relative humidity and temperature, said different ranges constituting different zones of relative humidity and temperature;

said controller responding to said relative humidity sensor, said temperature sensor, and said stored data to provide an output signal indicative of the variation of said temperature and said relative humidity compared to a selected range of relative humidity and temperature;

said controller having output signals to control said blower to turn said blower on and off;

whereby when the temperature sensed by said temperature sensor and the relative humidity sensed by said relative humidity sensor are outside said selected range said blower is turned on.

9. The improved air handling system of claim 8 wherein said controller is a microcomputer.

10. The improved air handling system of claim 8 wherein an input to said controller is an adjustable control device to selectively choose one of said different ranges.

11. The improved air handling system of claim 10 where there are five of said different ranges that can be selected.

12. The improved air handling system of claim 8 wherein additional air flows through a damper to the blower.

13. The improved air handling system of claim 12 wherein the damper is preset.

14. The improved air handling system of claim 8 wherein said blower is a constant speed blower.

* * * * *